Oct. 25, 1966  E. A. BARBER  3,281,093
SWITCH FOR PNEUMATIC CONVEYOR
Filed June 1, 1964  2 Sheets-Sheet 1
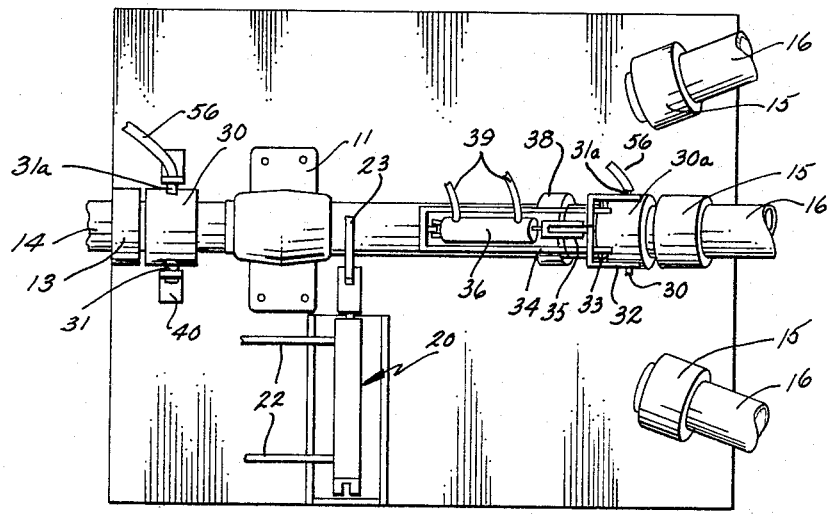
FIG. 1.
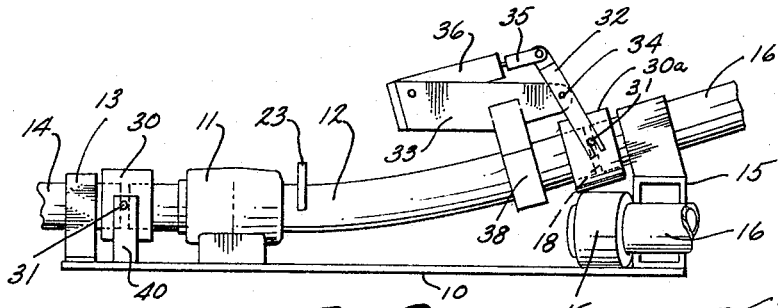
FIG. 2.
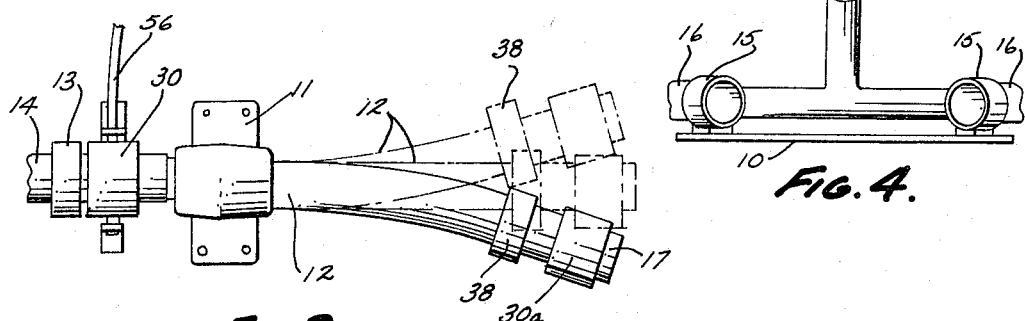
FIG. 3.
FIG. 4.
INVENTOR.
EDGAR A. BARBER
BY Price & Heneveld
ATTORNEYS

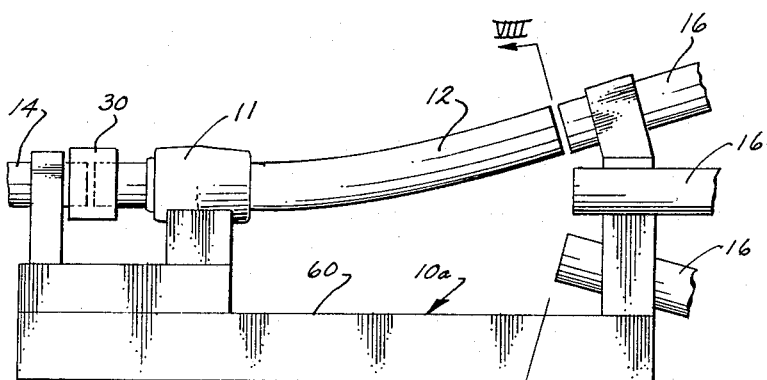
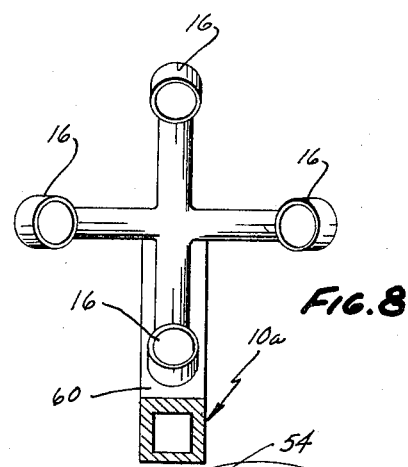
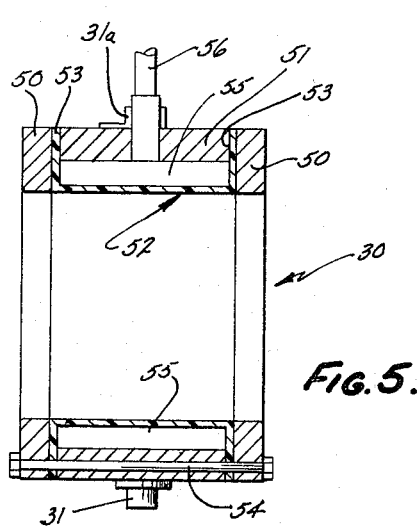
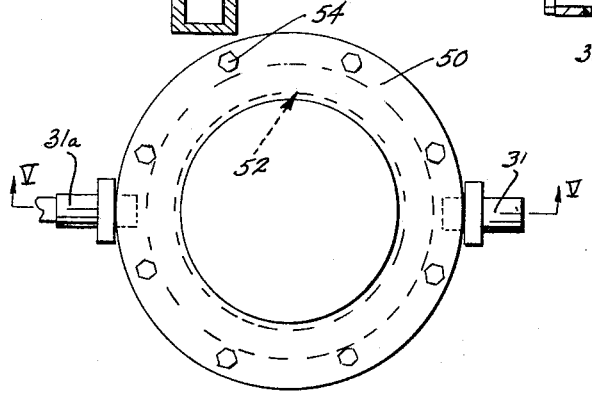
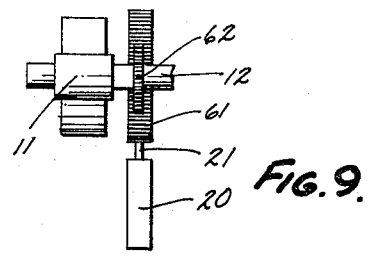

United States Patent Office 3,281,093
Patented Oct. 25, 1966

3,281,093
SWITCH FOR PNEUMATIC CONVEYOR
Edgar A. Barber, Newaygo, Mich., assignor to Newaygo Engineering Company, Newaygo, Mich., a corporation of Michigan
Filed June 1, 1964, Ser. No. 371,571
1 Claim. (Cl. 243—29)

This invention relates to pneumatic conveyors, and particularly to a switch for a pneumatic conveyor for comminuted solids.

In the conveying of comminuted solids, particularly the pneumatic conveyance of foundry sand, a number of problems arise. One of these is the extremely abrasive nature of the material. Further, the material is conveyed under pressure. It also frequently moves at high speeds. This combination has caused many problems in attempting to develop a durable and dependable switch by which the path of travel of the material may be shifted between any one of several conveying tubes or lines.

Because of the abrasive nature of sand, most materials from which switches of this type are constructed experience early functional failure. Further, the materials are heavy and are moved at high speeds through the lines with the result that wherever the charge of material is forced to change direction, severe impact loads are imposed on the conveying tubes. Often the material moves in slugs which tend to impact against the tube walls wherever there is a change in direction. Because of the weight, density and speed of the material, even slight changes in direction result in significant impact loads on the equipment. Some idea of this problem may be gained from the fact that it is not uncommon to transport several tons of sand through this equipment in substantially less than one minute. At the switches, this has proved to be a difficult problem because over a period of time the repeated impacts wear and loosen the switching equipment to the extent that the switch will no longer function properly.

Another problem is the fact that even under the best operating conditions, a certain amount of sand is likely to accumulate in the switch mechanism with severe adverse affects upon the equipment. In addition to this, in the average foundry the normal working conditions are adverse and severe, thus requiring the simplest of equipment. Also, this equipment has to be ruggedly constructed to withstand these conditions.

Another problem which has arisen in the design of this type of equipment is the provision of an effective seal at the joints in the conveying pipe. Most seals are too sensitive to the abrasive conditions of the sand, or are too costly and cumbersome to be effectively employed. Despite the severe working conditions and the problems arising from the nature of the material itself, it is desirable that these switching systems be sufficiently dependable and automatic that they can be remotely operated. It is also desirable that they be capable of providing a number of choices in the direction in which the sand is to be moved. It is often necessary to have three or more branch lines leading off from a switch. It is also desirable that the switch be quickly responsive to re-positioning from one line to another.

This invention provides a solution to these various problems by a piece of equipment which is simple, effective and durable. It also has the capability of serving from up to eight or even more branch or secondary lines from a single primary conveying line or tube. It also provides a durable yet effective and simple sealing mechanism which is not affected by the presence of small quantities of sand, and which is capable of effecting a seal despite the fact that the various parts may have minor misalignments or size differentials due to tolerance accumlation. It is also not significantly affected by wear. The equipment has the capability of withstanding the repeated effects of high impact and the conveyance of highly abrasive materials.

Those acquainted wtih the design and construction of pneumatic conveying equipment will understand the advantages and purposes of this invention upon reading the following specification and the accompanying drawings.

In the drawings:

FIG. 1 is a fragmentary, plan view of a pneumatic conveying system incorporating a switch constructed in accordance with this invention;

FIG. 2 is a side elevation view of the switch illustrated in FIG. 1;

FIG. 3 is a somewhat schematic plan view showing the switch mechanism in one directing position in solid lines, and in two additional positions in phantom lines;

FIG. 4 is an end elevation view of the distribution lines in an arrangement in which three of the distribution lines are utilized;

FIG. 5 is a central, sectional view of one of the seals used with this invention;

FIG. 6 is an end elevation view of the seal illustrated in FIG. 5;

FIG. 7 is a somewhat schematic, side elevation view of a modified form of this invention;

FIG. 8 is a sectional elevation view taken along the plane VIII—VIII of FIG. 7; and FIG. 9 is a fragmentary view showing a modified actuating mechanism for this invention.

In executing the objects and purposes of this invention there is provided a main feeder line of tubular construction such as a pipe. To this is connected a directing member of similar tubular diameter and size. The directing member has one end aligned with the main feeder line, and the other end offset at an angle. Two or more receiving or distribution lines are provided, arranged about a circle having its point of generation at the center line of the main feeder line. The directing member is mounted to rotate about an axis which is concentric with the center line of the main feeder line and the point of generation of the circle about which the distribution lines are arranged. Means are provided to swing the offset end of the directing member to align with any one of the distribution lines. When the directing member is aligned with one of the distribution lines, seal means are provided to effect a releasable seal between the end of the directing member and the selected distribution line. A similar seal means is provided to effect a seal at the joint between the main feeder line and the adjacent end of the directing member. Suitable prime mover equipment is provided to effect the actuation of the seals and the movement of the directing member.

Referring now specifically to the drawings, the numeral 10 indicates a base which may be in any suitable form, as for example, the plate member illustrated. Mounted on the plate is a bearing block 11 which rotatably mounts the directing member 12. Also mounted on the base plate 10 is a base block 13. It secures and supports the end of the stationary primary member 14. Mounted on the other end of the plate are a plurality of secondary base blocks 15 of various sizes, one for each of the secondary or distributing members 16. Like the base block 13, these are also stationary with respect to the base plate 10.

The primary member 14, the directing member 12 and the secondary or distributing member 16 are all tubular elements of rigid construction such as a heavy walled steel pipe. They are also all of the same diameter, and when aligned, form a continuous conduit for materials.

The portion of the directing member 12 adjacent the end of the primary member 14 is straight, and is coaxial with the primary member 14. This includes the portion of the directing member 12 which is seated in the bearing block 11. The other end of the directing member is curved on a gradual radius so that as the directing member is rotated on the bearing block 11, its free end 17 (FIG. 3) will traverse a circular path. It is necessary that this bend or curve be gradual to eliminate as far as possible interference with the free movement through it of the material and its carrier medium. The ends of the secondary or distributing members 16 are arranged in a circular pattern, corresponding to the circular path traced by the free end 17 of the distributing member. Thus, as the distributing member traverses its circular path, its free end will align with one after another of the receiving or distributing members. A small gap 18 is provided between the ends of the distributing members and the end of the directing member. This gap is only sufficient to permit the directing member to pass the distributing members without physical interference.

Any one of several means may be utilized to effect rotational movement of the directing member. Where the movement is to be limited such as 180 degrees or less, this can be accomplished by a simple rocking motion such as would be provided by the reciprocating actuator 20. This actuator has a cylinder equipped with a piston 21 which may be actuated either hydraulically or pneumatically through the supply line 22. The end of the piston is connected to an arm 23, whereby extension and retraction of the piston will rock the directing member 12 on its bearing 11.

Where the end of the directing member 12 abuts the end of the primary member 14, a seal 30 is provided. A similar seal 30a is provided at the other end of the directing member 12 where it abuts the ends of the distributing or secondary members 16. The internal construction of the seals 30 and 30a is identical and will be described in detail subsequently. The seal 30a is designed to slide lengthwise of the directing member 12. It is movable from an extended position as shown in FIG. 12 in which it overlaps the ends of both the directing member 12 and the secondary member 16 to a retracted position as shown in FIG. 3 where it is withdrawn entirely upon the directing member 12.

To accomplish this, the seal has a pair of gimbal pins 31 and 31a which engage the fork bracket 32. The fork bracket 32 is pivotally mounted to the base bracket 33 by pins 34. The upper end of the fork bracket 32 is pivotally secured to the end of the reciprocating piston 35 of the actuating cylinder 36. The other end of the actuating cylinder 36 is pivotally secured to the base bracket 34 by a suitable pivot mount. The base bracket 34 is secured to the directing member 12 by a rigid mount 38. The actuating cylinder 36 is operated by any suitable means such as gas or liquid supplied through the tubes 39. Sufficient slack is provided in these tubes to permit the tubes to travel with the directing member 12 as it rotates even though the other ends of the tubes may be secured to a fixed support.

The seal 30 is stationary and does not slide. It is supported on the gimbal pins 31 and 31a by a stationary mount 40 secured to the base plate 10.

The seal 30 has a pair of annular end plates 50, spaced apart by a tubular jacket 51 (FIG. 5). Between the end plates 50 and inside of the jacket 51 is a flexible collar 52. The collar 52 has a pair of radially extending flanges 53 which extend outwardly between the jacket and the end plates 50 and is clamped between them when the seal is assembled by means of the bolts 54. The collar is of a flexible material such as a natural or synthetic rubber or other suitable flexible, abrasion resistant, synthetic resinous material. The main portion of the collar 52 is spaced inwardly from the inner face of the jacket 51 to form a sealed air chamber 55. The inside diameter of the collar is such that when the chamber 55 is not under pressure, and the collar is relaxed, this central opening is of the same diameter as the openings through the end plates 50.

A suitable inflatable medium such as air is introduced to the chamber 55 through a conduit 56. In the particular construction shown, the conduit 53 enters through the gimbal pin 31a. It will be seen that the introduction of a suitable pressurized medium such as air into the chamber 55 will expand the inner portion or diaphragm of the collar 52 inwardly so that it will clamp about the ends of the members within the seal and form a tight seal about these members to prevent leaks at the joint between the members. At the same time, when the diaphragm of the collar 52 is retracted, the seal does not interfere with either the rotation of the directing member or the lengthwise sliding of the seal on the directing member as is the case where the directing member abuts the secondary members. A flexible membrane of this type under pressure will effect a proper seal even though there may be some sand trapped between it and the outside surfaces of the members which with other types of seals might cause seal failure or excessive wear when the seal is actuated or moved lengthwise of one of the members or pipes.

This switch can be used to direct materials from a single supply line to two or more secondary or distribution lines. As suggested in FIGS. 1 and 4 with 180 degrees of rotation, the switch will serve three distribution lines. As suggested in FIGS. 7 and 8, the switch may be arranged to serve four distribution lines.

When the switch is used to serve three distribution lines, the arc of swing of the directing member 12 is limited to 180 degrees. It will be recognized that additional distribution lines may be added within this arc of swing, increasing the number of distribution lines to five, or even more depending upon the space available for locating them.

If a suitable base is substituted for the base plate 10 to eliminate interference between the base and the swing of the directing member 12, the directing member 12 may be permitted to swing a full 360 degrees, serving eight or more distribution lines. FIGS. 7 and 8 suggest such an arrangement in which the bearing block 11 is mounted on a base 10a which has a centrally relieved portion 60 to provide clearance for the directing member 12. The other end of the base provides means for mounting the various secondary members 16. It is important that the base 10a be of such strength that the bearing block 11 is kept properly aligned with the distribution or secondary members 16 so that the directing member 12 as it swings through its circular path will always accurately align with each of the secondary members. The construction of such a base is a routine mechanical problem, and therefore, further detail of such a base is not shown.

To eliminate the necessity for deepening the relieved area 60 to clear the seal 30a and its actuating mechanism, this structure can be removed from the directing member 12 and one such seal placed on each of the distributing members 16.

Where the distributing member is to make a swing through a substantial arc, it will be necessary to provide a different driving mechanism than that shown in FIG. 1. Such a mechanism is suggested in FIG. 9, wherein the piston 21 of the cylinder 20 is connected to and actuates a rack 61. The rack engages to a suitable gear 62 mounted on the directing member 12, whereby the reciprocation of the rack 61 will cause rotation of the directing member 12. In this manner, it is simple to obtain a full 360 degrees of rotation of the directing member.

It will be recognized that many different types of commercially available indexing mechanisms may be employed with this invention to assure quick and easy selection of the proper secondary member 16 at which the directing member 12 is to stop. Also, these mechanisms can assure accurate alignment between the directing member and any one of the secondary members to permit actuation of the seal. This, however, is merely adding conventional refinement to the basic idea which has been disclosed and described above.

It will also be recognized that where the swing of the directing member is to be a full 360 degrees, the seal 31a and its actuating mechanism may be retained on the directing member provided sufficient base clearance is provided. To prevent undue problems of supplying air to the seal, the rotation of the directing member may be limited to 360 degrees or less so that its rotation is reciprocating in nature rather than always in one direction. It is a conventional engineering problem to provide hoses which will permit such rotation.

This invention has been particularly designed for equipment for pneumatically conveying foundry sand. It is adapted to the severe and rugged conditions under which such equipment must operate. It will be recognized, however, that this particular invention may be employed for any other pneumatic conveying system. In fact, the seals 30 can be made sufficiently efficient that this system could be used for conveying liquid mediums as well as gaseous mediums.

Having described a preferred embodiment of this invention and some modifications thereof, it will be recognized that other modifications may be made, all embodying the spirit of this invention. Such of these modifications as incorporate the principles of this invention are to be considered as included in the hereinafter appended claim, unless the claim expressly states otherwise.

I claim:

A switching device for pneumatic foundry sand conveyors comprising: a primary tubular member having an open end; a plurality of secondary tubular members each offset radially from and spaced lengthwise from said open end of said primary member; a tubular directing member having one end aligned with said open end of said primary member; means mounting said directing member for rotation about the longitudinal axis of said primary member; the other end of said directing member being offset through a smooth, continuous curve to align with the ends of each of said secondary members as said directing member is rotated about said axis; first sealing means for effecting a seal between said primary and directing members; said first sealing means being stationary with respect to both the primary and directing members and having a tubular jacket telescopically seated over the ends of both said primary and directing members; said jacket having an internal annular inflatable collar overlapping the ends of both said primary and directing members, said jacket when inflated pressing against the ends of both of said members and forming a seal therewith; second sealing means for effecting a seal between said directing member and each of said secondary members; said second sealing means having a tubular jacket slidable along one of said directing and secondary members between an active and a retracted position; in active position said jacket being telescopically seated over the ends of both said directing and one of said secondary members and in retracted position being seated entirely over said directing member; a reciprocating prime mover mounted on said directing member for travel therewith and link means connecting said prime mover to said jacket for shifting said jacket between its active and retracted positions said jacket having an internal annular inflatable collar overlapping the ends of both said directing and one of said secondary members when said jacket is in active position, said collar when inflated pressing against the ends of both of said members and forming a seal therewith.

References Cited by the Examiner

UNITED STATES PATENTS 2,564,670  8/1951  Bratt.

FOREIGN PATENTS 711,367  2/1931  France.
1,133,731  11/1956  France.
233,925  5/1911  Germany.
20,468  9/1911  Great Britain.
478,807  1/1938  Great Britain.
569,773  11/1957  Italy.

EVON C. BLUNK, *Primary Examiner.*

H. C. HORNSBY, *Assistant Examiner.*